US006769917B2

(12) United States Patent
Fujino et al.

(10) Patent No.: US 6,769,917 B2
(45) Date of Patent: Aug. 3, 2004

(54) METHOD FOR INDICATING DEFECTIVE PART IN EDUCATIONAL MATERIAL AND APPARATUS FOR INDICATING DEFECTIVE PART IN EDUCATIONAL MATERIAL

(75) Inventors: Akio Fujino, Ota (JP); Hiroshi Kuzumaki, Ota (JP); Shunichi Kamikawa, Kawasaki (JP); Norio Takeda, Ota (JP); Hitoshi Ozawa, Ota (JP)

(73) Assignee: Fujitsu Limited, Kawasaki (JP)

( * ) Notice: Subject to any disclaimer, the term of this patent is extended or adjusted under 35 U.S.C. 154(b) by 119 days.

(21) Appl. No.: 10/288,504

(22) Filed: Nov. 6, 2002

(65) Prior Publication Data

US 2003/0186207 A1 Oct. 2, 2003

(30) Foreign Application Priority Data

Mar. 27, 2002 (JP) ........................................ 2002-088980
Jun. 26, 2002 (JP) ........................................ 2002-186558

(51) Int. Cl.[7] ................................................ G09B 7/00
(52) U.S. Cl. ........................ 434/322; 434/323; 434/350; 434/362
(58) Field of Search ................................ 434/322, 323, 434/350, 362

(56) References Cited

U.S. PATENT DOCUMENTS

| | | | | | |
|---|---|---|---|---|---|
| 5,267,865 | A | * | 12/1993 | Lee et al. | 434/350 |
| 6,498,921 | B1 | * | 12/2002 | Ho et al. | 434/362 |
| 6,501,937 | B1 | * | 12/2002 | Ho et al. | 434/362 |
| 2001/0018178 | A1 | * | 8/2001 | Siefert | 434/322 |

\* cited by examiner

Primary Examiner—John Edmund Rovnak
(74) Attorney, Agent, or Firm—Staas & Halsey LLP

(57) ABSTRACT

In an education system using a network, a method for automatically detecting a defective part in an education material and for indicating the defective part is provided. A defective information storing means for storing a defect point correlation with a portion of an education material is provided. When the system receives a question from a student's terminal PC, a defect point of a corresponding portion of an educational material, in the defective information storing means, is updated, based on the received question. By this update, whenever a question is sent from a student's terminal, a defect point stored correlation to a portion of an educational material is accumulated. It is judged whether the defect point reaches a predetermined threshold value, and the corresponding portion of the educational material is transmitted to a terminal of a system administrator, based on the result of the judgement. Accordingly, a defective part of each educational-material unit and the nature of the defectiveness can be easily detected by the system administrator.

6 Claims, 13 Drawing Sheets

Fig.2

EDUCATIONAL-MATERIAL DB 31

| EDUCATIONAL MATERIAL NAME | CHAPTER | SECTION | PARAGRAPH | EDUCATIONAL-MATERIAL UNIT NUMBER | EDUCATIONAL MATERIAL ENTITY |
|---|---|---|---|---|---|
| NETWORK BASIC | 2. NETWORK ARCHITECTURE | 2.4 TCP/IP | IP ADDRESS | 37 | IP ADDRESS: IP ADDRESS IS AN ADDRESS CONSTITUTED BY 32 BITS. WHEN THE IP ADDRESS IS SET OR WRITTEN, IT IS DIVIDED INTO FOUR GROUPS, EACH OF WHICH HAS 8 BITS.... |

Fig.3

FAQ-DB 33

| FAQ RECORD NUMBER | KEYWORD | QUESTION | ANSWER |
|---|---|---|---|
| 125 | IP ADDRESS<br>NETWORK ADDRESS<br>HOST ADDRESS<br>TCP/IP<br>LAYER 3<br>NETWORK LAYER<br>OSI REFERENCE MODEL | WHAT IS THE HOST ADDRESS OF TCP/IP? | THE HOST ADDRESS IS DESCRIBED AT THE DESCENDENT OF THE IP ADDRESS IN TCP/IP··· |

Fig.4

EDUCATIONAL-MATERIAL/KEYWORD TABLE 32

| EDUCATIONAL-MATERIAL UNIT NUMBER | NEW KEYWORD | SUPPLEMENTAL KEYWORD | REFERENCE KEYWORD |
|---|---|---|---|
| 37 | IP ADDRESS<br>DOT NOTATION<br>NETWORK ADDRESS<br>HOST ADDRESS | LAYER 3<br>NETWORK LAYER<br>ADDRESS | COMPUTER<br>NETWORK<br>DECIMAL NUMBER<br>BIT<br>DOT<br>OSI REFERENCE MODEL |

Fig.6

KEYWORD/EDUCATIONAL-MATERIAL UNIT RELATION TABLE 34

| KEYWORD | EDUCATIONAL-MATERIAL UNIT 1 | EDUCATIONAL-MATERIAL UNIT 2 | EDUCATIONAL-MATERIAL UNIT 3 |
|---|---|---|---|
| IP ADDRESS | 10 | 5 | 0 |
| NETWORK ADDRESS | 10 | 5 | 0 |
| HOST ADDRESS | 10 | 5 | 1 |
| LAYER 3 | 0 | 10 | 5 |
| NETWORK LAYER | 0 | 10 | 0 |
| OSI REFERENCE MODEL | 0 | 10 | 5 |
| DOT NOTATION | 0 | 0 | 10 |
| ADDRESS | 0 | 0 | 10 |
| NETWORK ADDRESS | 1 | 0 | 1 |

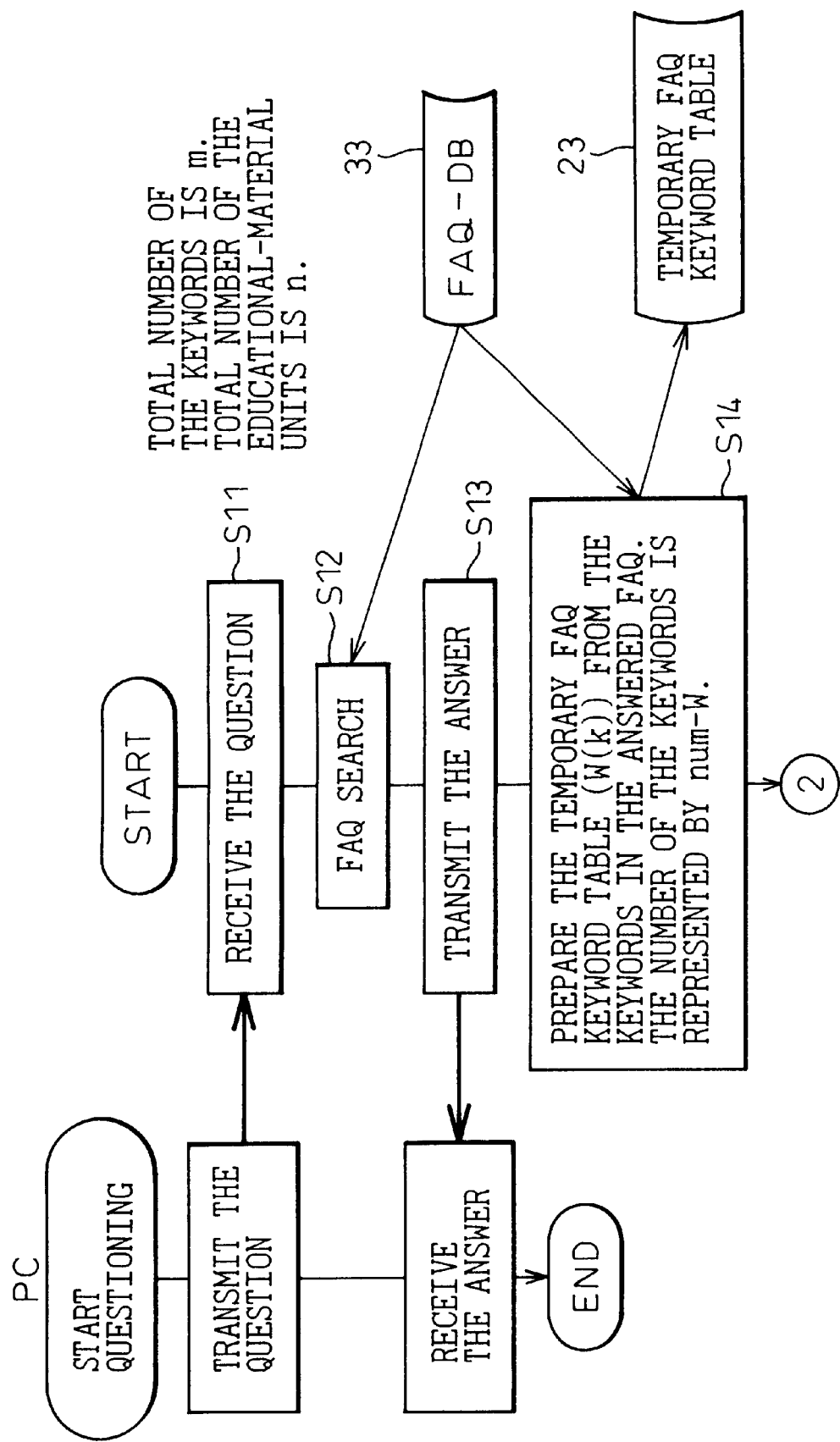

Fig.9

TEMPORARY FAQ KEYWORD TABLE 23

| KEYWORD |
|---|
| IP ADDRESS |
| NETWORK ADDRESS |
| HOST ADDRESS |
| LAYER 3 |
| NETWORK LAYER |
| OSI REFERENCE MODEL |
| NETWORK |

Fig.10

EDUCATIONAL-MATERIAL UNIT DEFECT POINT TABLE 35

| KEYWORD | EDUCATIONAL-MATERIAL UNIT 1 | EDUCATIONAL-MATERIAL UNIT 2 | EDUCATIONAL-MATERIAL UNIT 3 | TOTAL DEFECT POINT FOR EACH KEYWORD |
|---|---|---|---|---|
| IP ADDRESS | 10 | 5 | 0 | 15 |
| NETWORK ADDRESS | 10 | 5 | 0 | 15 |
| HOST ADDRESS | 10 | 5 | 1 | 16 |
| LAYER 3 | 0 | 10 | 5 | 15 |
| NETWORK LAYER | 0 | 0 | 0 | 0 |
| OSI REFERENCE MODE | 0 | 0 | 0 | 0 |
| DOT NOTATION | 0 | 0 | 0 | 0 |
| ADDRESS | 0 | 0 | 0 | 0 |
| NETWORK | 0 | 0 | 0 | 0 |
| TOTAL DEFECT POINT FOR EACH EDUCATIONAL-MATERIAL UNIT | 30 | 25 | 6 | 61 |

Fig.11

DEFECTIVE EDUCATIONAL-MATERIAL UNIT NUMBER TABLE 36

| DEFECTIVE EDUCATIONAL-MATERIAL UNIT NUMBER |
|---|
| 37 |

Fig.12

```
   BASED ON THE FAQ REFERENCE STATE OF STUDENTS, IT
 IS ASSUMED THAT THE FOLLOWING EDUCATIONAL-MATERIAL
 UNIT CONTAINS A DEFECTIVE PART.

EDUCATIONAL-MATERIAL UNIT NUMBER: 2
ACCUMULATED DEFECT POINTS       : 70 POINTS

KEYWORDS ASSUMED TO CONTAIN
A DEFECTIVENESS                          DEFECT POINT
--------------------------------         ------------
IP ADDRESS                                10 POINTS
NETWORK ADDRESS                           10 POINTS
HOST ADDRESS                              10 POINTS
LAYER 3                                   20 POINTS
NETWORK LAYER                             10 POINTS
OSI REFERENCE MODEL                       10 POINTS
```

METHOD FOR INDICATING DEFECTIVE PART IN EDUCATIONAL MATERIAL AND APPARATUS FOR INDICATING DEFECTIVE PART IN EDUCATIONAL MATERIAL

BACKGROUND OF THE INVENTION

1. Field of the Invention

The present invention relates to a method for improving an educational material used in an education system using a network.

Also, the present invention relates to an apparatus for implementing the educational material improving method.

2. Description of the Related Art

There exists an education system using a computer. The education system is constituted by connecting a host computer at an education center, and plurality of students' terminals, through a network such as the Internet. The educational materials used in the education system are produced by the education center side. The educational materials are transmitted unit-by-unit from the education center to the students' terminals through the network. The students learn using the received educational materials.

Because the educational materials are produced from the viewpoint of the producer, it is possible that there exists a part which is difficult for the student to understand. In a group education where an instructor faces to plurality of students, because the instructor can directly watch reactions of the students, the instructor can grasp a defective part of the educational material in the lesson. Thus, the instructor can compensate for the defective part of the educational material during the lesson, and further, can correct the defective part of the educational material later.

However, in the above mentioned education system, because the instructor cannot see the behavior of the students, there is no way of directly detecting the defective part of the educational material. Thus, there is no chance for correcting the defective part of the educational material and it is not possible to correct the defective part during the lesson.

SUMMARY OF THE INVENTION

The object of the present invention is to obtain a method for automatically detecting a defective part in an educational material, and indicating the defective part, in an education system using a network.

Also, the object of the present invention resides in providing an apparatus for implementing the above-mentioned method for notifying a defective part.

The present invention was invented to attain the above-mentioned objects. In the system for providing an educational service using a network, according to the present invention, there is provided a defective information storing means for storing a defect point correlation with a portion of an educational material. When the system receives a question from a student's terminal, the defect point of the portion of the educational material is updated, in the defective information storing means, based on the received question.

By this update, whenever a question is sent from a student's terminal, the defect points stored correlation with the portions of the educational materials are accumulated. It is judged whether the defect points have reached a predetermined threshold value, and the corresponding portion of the educational material is transmitted to the terminal of the system administrator, based on the result of the judgement.

Then, the system administrator's side can easily detect the defective part in each educational-material unit and the nature of the defect.

Also, upon updating the above-mentioned defect point, a keyword appearing in a portion of the educational material is assigned a weight, and the defect point is updated in accordance with the weight, so that the amount of defects can be detected more accurately.

BRIEF DESCRIPTION OF THE DRAWINGS

The above object and features of the present invention will be more apparent from the following description of the preferred embodiment with reference to the accompanying drawings, wherein:

FIG. 2 shows a data layout of the educational-material DB in FIG. 1.

FIG. 3 shows a data layout of the FAQ-DB in FIG. 1.

FIG. 4 shows a data layout of the educational-material/keyword table.

FIG. 6 shows a data layout of the keyword/educational-material unit relation table in FIG. 1.

FIGS. 7A and 7B are flow charts showing a process of the FAQ question/answer section in FIG. 1 (No. 1).

FIG. 9 shows a data layout of the temporary FAQ keyword table in FIG. 1.

FIG. 10 shows a data layout of the educational-material unit defect point table in FIG. 1.

FIG. 11 shows the nature of the defective educational-material unit number table in FIG. 1.

FIG. 12 shows a screen displayed at the educational-material unit defective part displaying section.

DESCRIPTION OF THE PREFERRED EMBODIMENTS

An embodiment of the present invention will be explained using the drawings.

Figure 1:
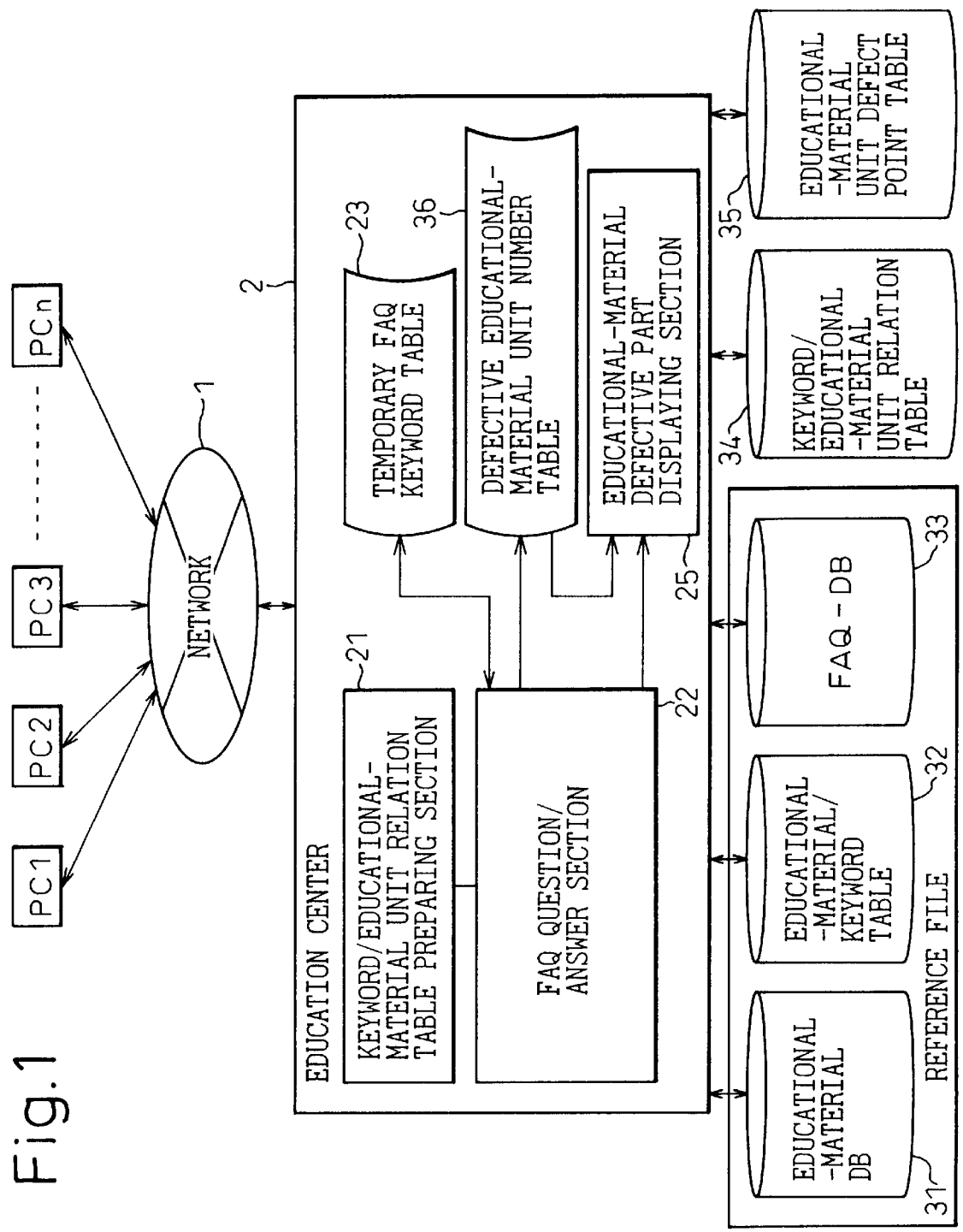
FIG. 1 shows a constitution of an education system implementing a method for indicating a defective part in an educational material according to the present invention.

FIG. 1 is a block diagram of an education system implementing a method for indicating a defective part in an educational material according to the present invention.

The education center 2 is provided with a keyword/educational-material unit relation table preparing section 21 and a FAQ question/answer section 22. FAQ is an abbreviation of Frequently Asked Question.

The plurality of students' terminals PC1 to PCn are connected to the education center 2 through a network 1. The network 1 is constituted by Internet, LAN, a dedicated line, or the like.

The FAQ question/answer section 22 grasps the defective part of the educational-material unit by referring to various tables 23, 32, 34, 35 and 36 and various DB ("database" is abbreviated to "DB") 31 and 33 and displays it at the educational-material unit defective displaying section 25. The contents of the process in the keyword/educational-material unit relation table preparing section 21 and the FAQ question/answer section 22, and the contents of each table and each DB will be described bellow.

The educational-material DB 31, the educational-material/keyword table 32 and the FAQ-DB 33 have been prepared as reference files.

The educational-material DB 31 will be explained.

The education center 2 side produces educational materials used in the education system and manages one educational material by dividing it into small units having one to several paragraphs. These units are called educational-material units.

The educational material is recorded in the educational material DB 31 on an educational-material unit basis.

FIG. 2 shows a data layout of the educational material DB 31.

The drawing shows one of the plurality of educational material units recorded in the educational material DB 31. This educational material unit belongs to the educational material name "Network Basic", chapter "2. Network Architecture", section "2.4 TCP/IP", and paragraph "IP address", and is assigned the educational material unit number 37. The content of the educational material unit is recorded in the "educational material entity".

The FAQ-DB 33 will be explained.

When a student has a question, he/she asks the question to the education center 2. However, it is difficult for a student in the process of learning to prepare an appropriate question. Accordingly, the education center 2 side assumes the anticipated questions (FAQ) from students, prepares questions and answers thereof and records them in the FAQ-DB 33.

Upon receiving a request of question from a student, the education center 2 retrieves plurality of questions which are thought to be suitable for the student, from the FAQ-DB 33, and presents them. The student selects a question expressing what he/she would like to ask, from the presented questions.

Accordingly, by using the FAQ, even the student in the process of learning can accurately raise a question by properly expressing his/her question.

FIG. 3 shows a data layout of the FAQ-DB 33.

The drawing shows one of the plurality of FAQ recorded in the FAQ-DB 33. In the illustrated FAQ, the question and the answer, the keywords extracted from the question and the answer, and the FAQ record number 125 are recorded.

The educational-material/keyword table 32 will be explained.

The educational-material/keyword table 32 becomes a base for preparing the following keyword/educational-material unit relation table 35.

For each educational-material unit recorded in the educational material DB (FIG. 2), keywords are extracted from the "educational material entity". The extracted keywords are classified into new keywords, supplemental keywords and reference keywords, and are recorded in the educational-material/keyword table 32 for each educational-material unit.

FIG. 4 shows a data layout of the educational-material/keyword table 32.

The drawing shows the content of one (educational material unit number 37) of the plurality of the educational-material units recorded in the table 32.

The "new keyword" is a keyword which has not appeared in the educational-material units prior to the educational-material unit number 37, but appears in the educational-material unit number 37 for the first time, and which is explained in the "educational material entity" (FIG. 2) of the educational-material unit number 37. In the illustrated example, the four keywords such as "IP address" are shown.

The "supplemental keyword" is a keyword which is not new in the educational-material unit number 37, but is supplementary explained in the "educational material entity". In the illustrated example, the two keywords such as "layer 3" are shown.

The "reference keyword" is a keyword which is included, but not explained in the "educational material entity". In the illustrated example, the five keywords such as "computer" are shown.

Figure 5A:
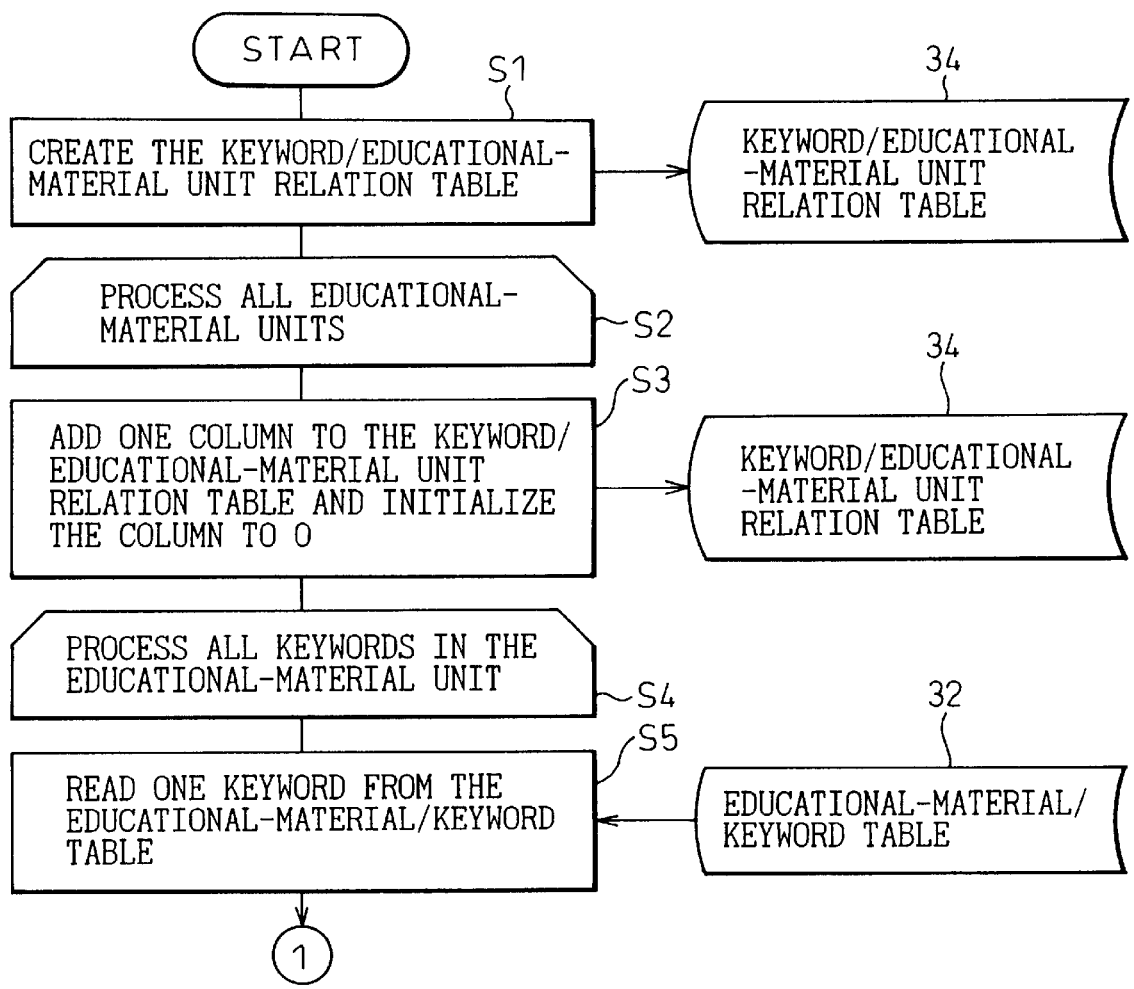
FIGS. 5A and 5B are flow charts showing a process for preparing the keyword/educational-material unit relation table in FIG. 1.
Figure 5B:
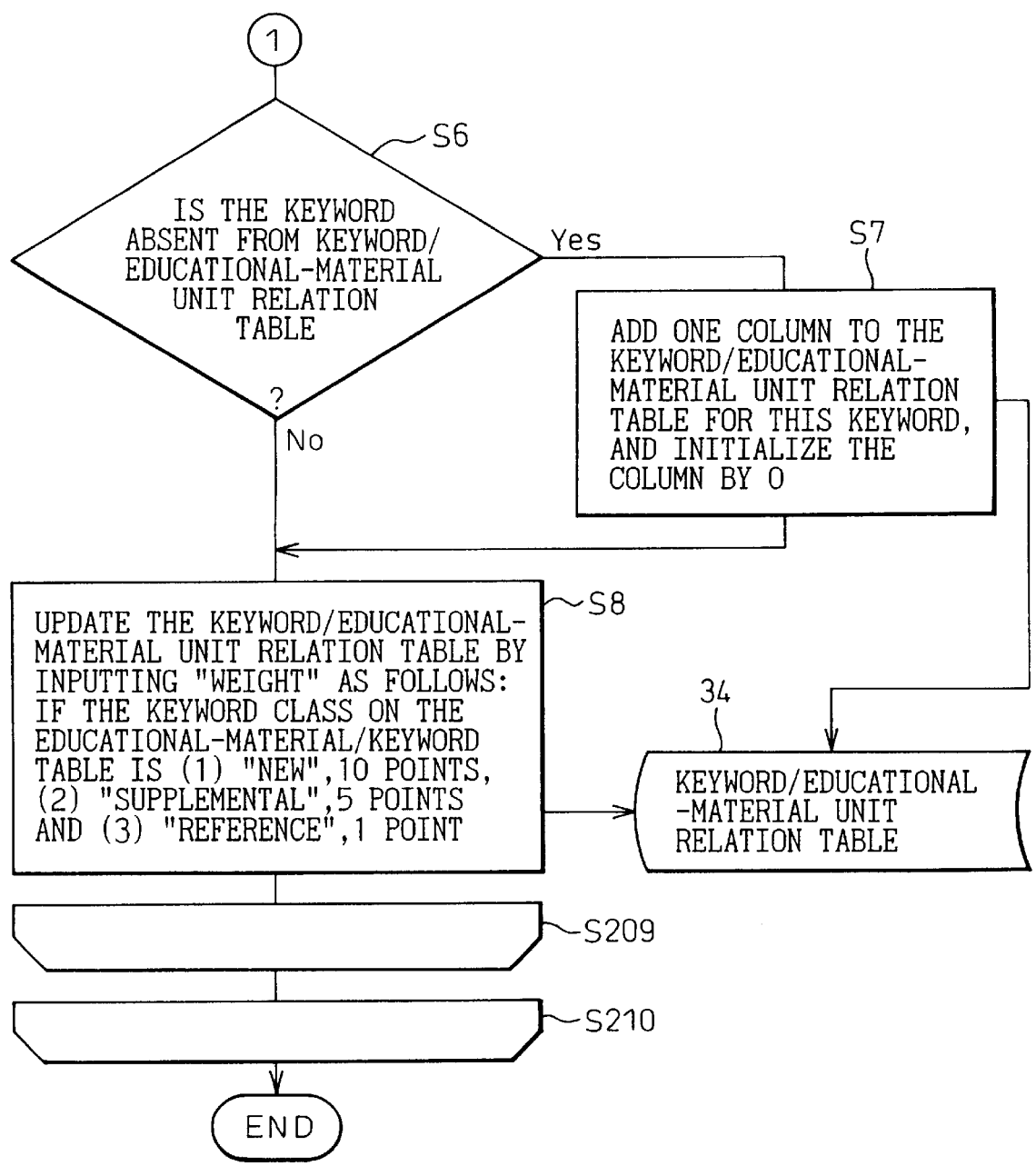

Referring back to FIG. 1, the keyword/educational-material unit relation table preparing section 21 prepares the keyword/educational-material unit relation table 34 using the above-mentioned educational-material/keyword table 32. using the flow charts in FIGS. 5A and 5B, the process of preparing the keyword/educational-material unit relation table 34 by the keyword/educational-material unit relation table preparing section 21 will be explained.

At first, the keyword/educational-material unit relation table 34 is created (S1).

FIG. 6 shows a data layout of the keyword/educational-material unit relation table 34. The illustrated table shows a completed state. Also, only a part of keywords and educational-material units are shown to make the drawing easier to understand.

Next, by repeating the steps S2 to S210, with regard to all the educational-material units (educational material unit numbers 1 to n) recorded in the educational-material/keyword table 32 (FIG. 4), the keyword extracting process and the keyword weighting process are performed. Whenever the process returns to the step S2, the process proceeds from the educational-material unit number 1 to n. When the process of the last educational-material unit number n is completed, the process of FIG. 5 ends.

In the step S3, one column is added to the keyword/educational-material unit relation table 34 for adding an educational-material unit. In this column, the number of educational-material units to be processed this time is assigned and the content thereof is initialized as 0. In the example of FIG. 6, when the educational-material unit having the educational material number 3 is added, the column of educational material number 3 is added. Because the example in FIG. 6 shows a complete state of the table, numerals other than 0 are filled as the contents of the column.

Next, by repeating the steps S4 to S209, the keyword weighting process is performed for all the keywords recorded in the educational-material/keyword table 32 (FIG. 4). Whenever the process returns to the step S4, the next keyword is targeted.

One keyword is read from the educational-material/keyword table 32 (S5).

It is judged whether this keyword is absent on the keyword/educational-material unit relation table 34 or not. If it is absent (Yes), one row is added to the table 34 to record this keyword, and the content thereof is initialized by 0 (S7).

For example, if the keyword "network" is read, the row "network" is inserted in the keyword/educational-material unit relation table 34 (FIG. 6).

Then, the process proceeds to the step S8.

If the step S6 is No, the process directly proceeds to the step S8. For example, if the read keyword is "IP address", which has been recorded in the table 34, no addition of a new row is performed.

By the above-mentioned process, the rows of keywords are accumulated as shown in FIG. 6. Also, by the process of steps S6 and S7, one keyword appears in only one row. Because the example in FIG. 6 shows the state where the process proceeds, numeric values showing the subsequently explained weight have been filled in.

In the step S8, the "weight" of the keyword is recorded in the keyword/educational-material unit relation table 34, and the table 34 is updated.

If the keyword read from the educational-material/keyword table 32 (FIG. 4) at the step S5 is the one read from the "new keyword", the "weight" is 10 points, if it is read from the "supplemental keyword", the "weight" is 5 points, and if it is read from the "reference keyword" the "weight") is 1 point on the table 32.

This weight is recorded at the intersecting point of the corresponding educational-material unit number and the corresponding keyword, in the keyword/educational-material unit relation table 34 (FIG. 6).

As is apparent from the table 34 in FIG. 6, a higher numeric value is given to the educational-material units having a closer relation, for each keyword. No point (0 point) is given to the educational-material unit having no relation.

By repeating the steps from S4 to S209, the process for all keywords in one educational-material unit is performed.

When the process for one educational-material unit is completed, the process returns to the step S2, and the process for the next educational-material unit is performed. When the process for all educational-material units is completed, the process of FIG. 5 ends, and the keyword/educational-material unit relation table 34 is complete as shown in FIG. 6.

Using FIGS. 7A, 7B and FIG. 8, the process of indicating the defect part in the educational-material, by the FAQ question/answer section 22, will be explained.

Figure 7B:
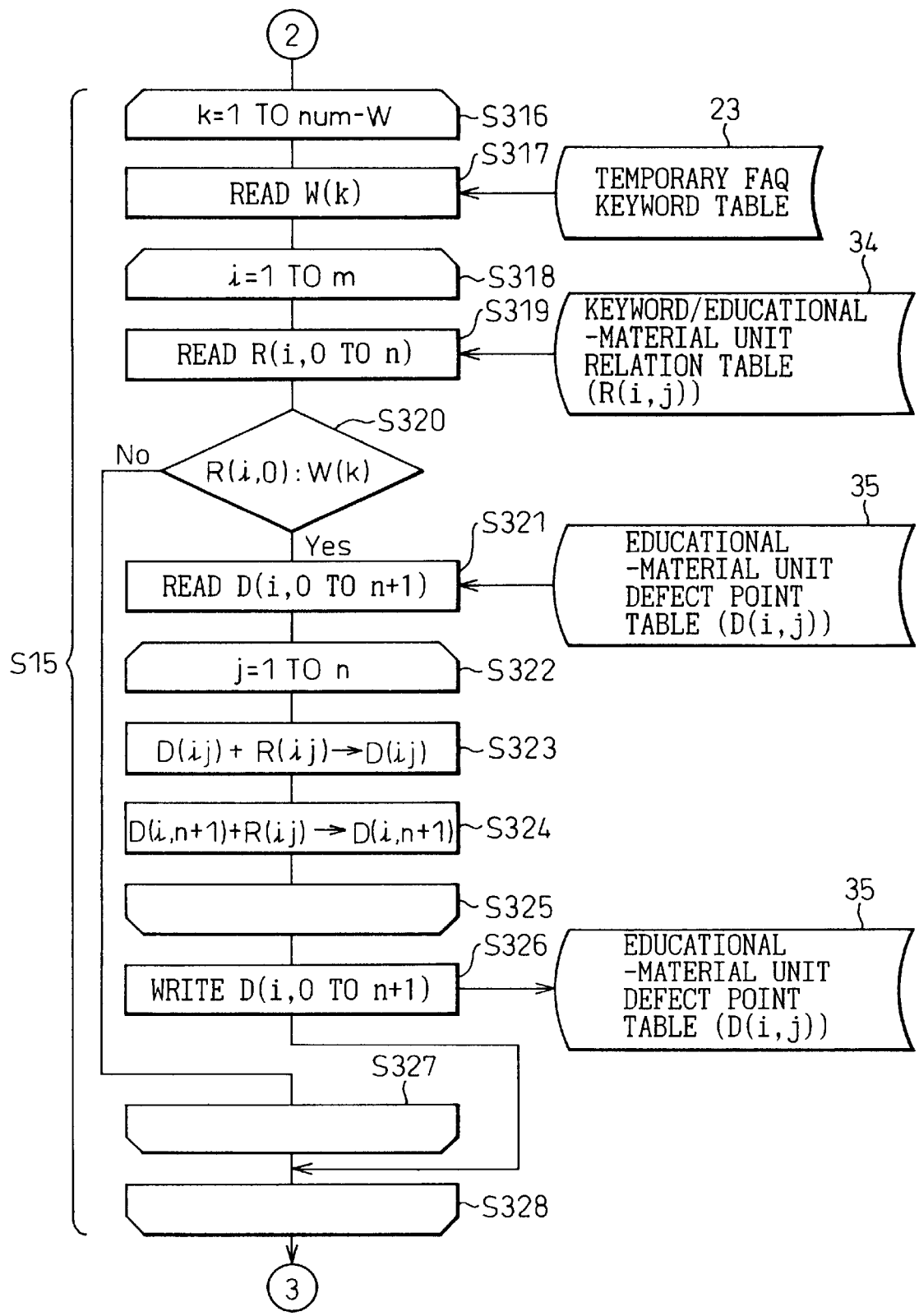

FIGS. 7A and 7B show the process for preparing the educational-material unit defect point table 35.

The student proceeds the course using the educational material received by the student's personal computer PC from the education center 2. If the student has a question in the process of learning, the student transmits a question request from the student's personal computer PC to the education center 2.

In the steps S11 to S13, the process from receiving the question to transmitting the answer is performed. Based on the data obtained from this process, the process for judging the defective part in the educational material (the process of S14 or later) is performed.

Upon receiving the question request (S11), the FAQ question/answer section 22 conducts the FAQ search (S12) and transmits the answer (S13).

In the FAQ search of the step S12, a plurality of questions which are thought to be suitable for the student are retrieved from the FAQ-DB 33 (FIG. 3). Since various methods have been proposed as the method for retrieving the questions, an appropriate method can be adopted therefrom.

The retrieved plurality of questions are presented to the student.

When the student selects one question from the presented questions, the answer corresponding to the question is retrieved from the FAQ-DB 33 and transmitted to the student.

The above-mentioned process is repeated until the student is satisfied with the answer. When the student obtains a desired answer, the process proceeds to the step S14.

The temporary FAQ keyword table 23 is prepared from the keywords of the FAQ answered to the student (S14).

If the answered FAQ has the record number 125, all keywords are read from the FAQ record number 125 in the FAQ-DB 33 (FIG. 3), and are recorded in the temporary FAQ keyword table 23.

FIG. 9 shows a content of the temporary FAQ keyword table 23.

Here, each keyword recorded in the table 23 is represented by W(k). The number of keywords is represented by num-W. Accordingly, the variable k in W(k) takes on values from 1 to num-W.

Next, by repeating the steps S316 to S328, all the keywords recorded in the temporary FAQ keyword table 23 (FIG. 9) are read. The process for updating the educational-material unit defect point table 35 (FIG. 10) is performed by the keywords.

In the step S317, one keyword W(k) is read from the temporary FAQ keyword table 23 (FIG. 9). Whenever the process returns from the step S328 to S316, the variable k(=1 to num-W) is incremented by 1 and, thereby, keywords are successively read from the table 23, at the step S317.

Next, by repeating the steps from S318 to S327, every keyword and the weight for each educational-material unit, recorded in the keyword/educational-material unit relation table 34 (FIG. 6) are read, and the process for updating the educational-material unit defect point table 35 is performed using the weight.

Each element of the keyword/educational-material unit relation table 34 (FIG. 6) is represented by R(i, j). The variable i represents a row and i=0 to m+1, wherein m represents a total number of the keywords. The variable j represents a column and j=0 to n+1, wherein n represents a total number of the educational material units. The i=0 row is the row for titles, and the j=0 column is the column for the keywords.

In the step S319, one row R(i, 0 to n) of the table 34 is read.

Whenever the process returns from the step S327 to S318, i is incremented by 1, from 1 to m, and thereby, one row of the table 34 is successively read at the step S319.

In the step S320, it is judged whether R(i,0)=W(k) or not. Namely, it is judged whether the keyword R(i,0)="keyword" within the row read from the keyword/educational-material unit relation table 34 at the step S319 match to the keyword w(k) read from the temporary FAQ keyword table 23 at the step S37. If they do not match (No), the process returns from the step S327 to S318, and the next keyword is read from the keyword/educational-material unit relation table 34 at the step S319.

By repeating the above-mentioned process, when R(i,0)= W(k) (the step S320 is Yes), in other words, when the keywords in the table 23 and the keywords in the table 34 match, the process proceeds to the step S321.

In the step S321, D(i, 0 to n+1) is read from the educational-material unit defect point table 35.

FIG. 10 shows a data layout of the educational-material unit defect point table 35.

Each element of the table 35 shown in FIG. 10 is represented by D(i, j). The variable i represents a row. The i=0 to m+1, wherein m represents a total number of the keywords. The variable j represents a column. The j=0 to n+1, wherein n represents a total number of the educational material units. The i=0 represents the row for titles, and the i=m+1 represents a row for the total defect points for each keyword. The j=0 represents the column for the keywords, and the j=n+1 represents a column for the total defect points for each educational-material unit.

Accordingly, in the step S321, the data in all columns of 0 to n+1 is read, with regard to the ith row in the educational-material unit defect point table 35 in FIG. 10. The variable i is successively set to any value of 1 to m in the step S318.

Next, by repeating the steps from S322 to S325, the defect points are accumulated. Whenever the process returns to the step S322, j is incremented by 1 from 1 to n, and the next column is read from the table 35.

In the step S323, D(i, j)+R(i, j) is calculated and the result is recorded in D(i, j). In the step S324, D(i, n+1)+R(i, n+1) is calculated and the result is recorded in D(i, n+1).

By repeating the steps from S322 to S325, with regard to one keyword, the numeric value R (weight) for each educational-material unit on the table 34 in FIG. 6 are accumulated in the element D on the table 35 in FIG. 10, as the defect points. Also, the total points for each keyword is accumulated in "total defect points for each keyword" on the table 35 in FIG. 10.

When the steps S322 to S325 are completed for one keyword, D(i, 0 to n+1) is written in the educational-material unit defect point table 35, at the step S326. At this time, the numeric value obtained by summarizing the defect points for each educational-material unit is recorded in "total defect points for each educational-material unit" on the table 35.

Accordingly, the defect points for the all educational-material units are updated (accumulated), regarding one keyword.

Next, the process returns from the step S328 to S316. In the step S317, the next keyword is read from the temporary FAQ keyword table 23. With regard to this keyword, the process of the step S318 and later are repeated. Thus, the accumulative sum of the defect points in the educational-material unit defect point table 35 is calculated, with regard to all keywords recorded in the temporary FAQ keyword table 23.

Also, if the process of FIGS. 7A and 7B are repeated, namely, the process (steps S11 to S13) that the student raises a question and the answer thereto is transmitted is repeatedly performed, the process of the step S14 and later is performed with regard to the keyword contained in the answer. Accordingly, the defect points for each keyword and for each educational-material unit are accumulated in the educational-material unit defect point table 35.

As is apparent from the above-mentioned explanation, every time that a student raises a question, the defect points are accumulated in the educational-material unit defect point table 35 (FIG. 10). Then, a keyword which is asked for many times, namely, a keyword with insufficient explanation obtains a large number of defect points, and the large defect points are given to the educational-material unit having a closer relation to the keyword.

Figure 8:
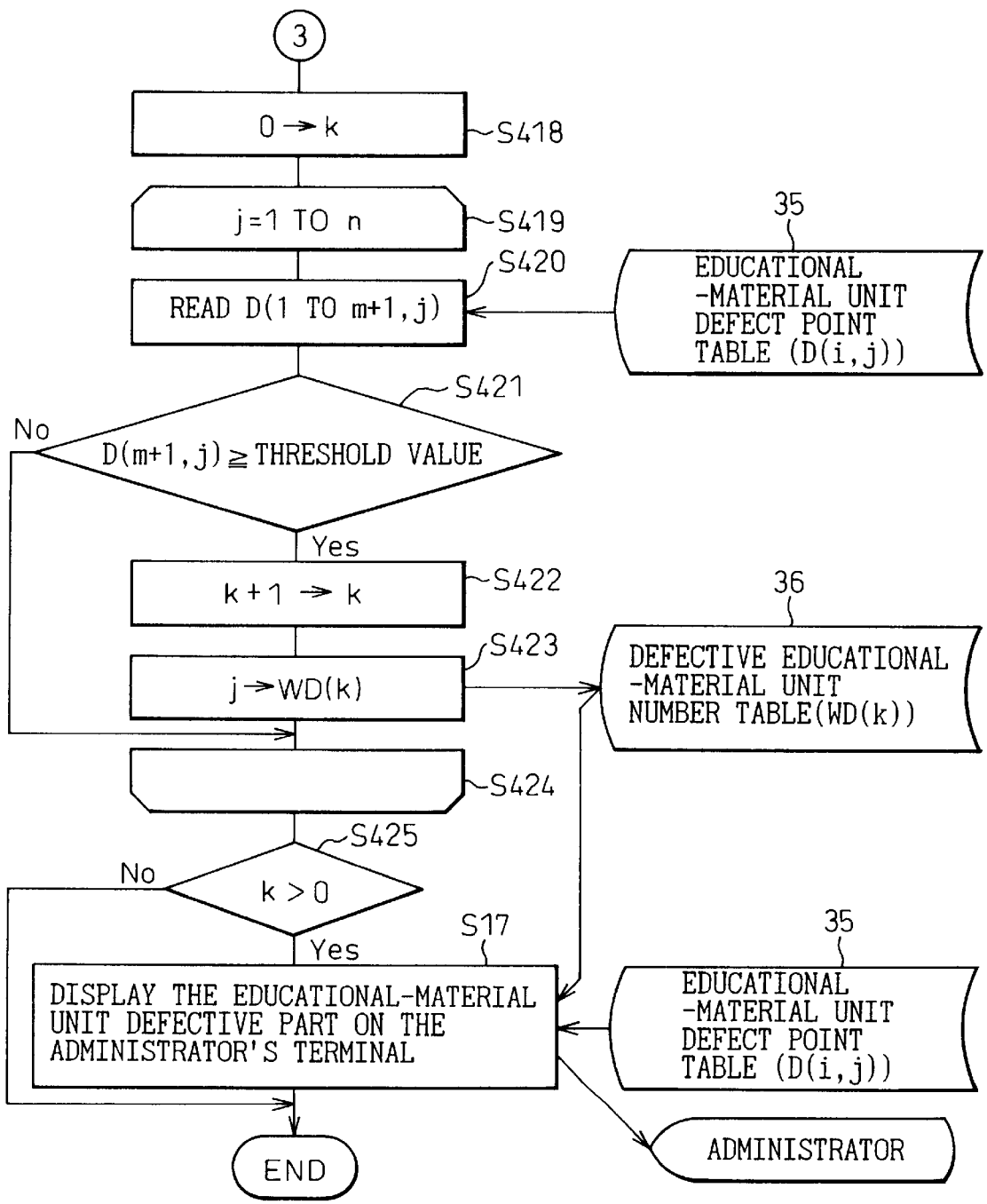
FIG. 8 is a flow chart showing a process of the FAQ question/answer section in FIG. 1 (No. 2).

When the process of FIGS. 7A and 7B ends, the process proceeds to that of FIG. 8. The defect points are judged regarding the updated educational-material unit defect point table 35.

In the step S418, the variable k is 0. By resetting the variable k, the process of judging the defectiveness, which is described below, is newly commenced, every time a question is raised in the steps S11 to S13 in FIG. 7.

Next, by repeating the steps S419 to S424, the process for updating the defective educational-material unit number table 36 (FIG. 11) is performed based on the educational-material unit defect point table 35 (FIG. 10). Whenever the process returns to the step S419, the variable i is incremented by 1 and takes on values of 1 to n.

In the step S420, the element D (1 to m+1, j) is read from the educational-material unit defect point table 35 (FIG. 10). Here, the variable j (column number) is set to any value of 1 to n in the step S419. In the step S420, the defect points of all rows (i=1 to m+1) of the jth column are read. The m+1th row means a row of "total defect points for each educational-material unit" in the table 35.

In the step s421, it is judged whether the total defect points D(m+1, j) for each educational-material unit is at least the threshold value, or not. As the threshold value, 70 points is set, for example. If it is lower than the threshold value, the process returns from the step S424 to S420, and proceeds to processing the next column in the educational-material unit defect point table 35. If it is the threshold value or more, the process proceeds to the step S422.

In the step S422, the variable k is incremented by 1. In the step S423, the value of the variable j is put in the element WD(k) of the defective educational-material unit number table 36.

FIG. 11 shows a content of the defective educational-material unit number table 36. In the table 36, the number j of educational-material unit (37 in the illustrated example), whose total defect point is the threshold value of 70 or more, is recorded.

In the illustrated example, there is only one element WD in the table 36. However, if there are plurality of educational-material units having the defect point of the threshold value or more, the number k of the element WD is prepared corresponding to the number of the educational-material units and the number j of the educational-material units judged as defective are recorded.

When the steps S419 to S424 are repeated and the process for all educational-material units in the educational-material unit defect point table 35 (FIG. 10) is completed, the process proceeds to the step S425.

In the step S425, it is judged whether the variable k exceeds 0 (1 or more), or not. If no educational-material unit number is recorded in the defective educational-material unit number table 36, k=0, that is, No, and the process ends. If any educational-material unit number is recorded (Yes), the defective part of the educational material is displayed on the administrator's terminal (the educational-material unit defective part displaying section 25).

Here, the necessary data is extracted from the defective educational-material unit number table 36 and the educational-material unit defect point table 35 to prepare a screen. The screen is displayed at the educational-material unit defective part displaying section 25, and the process of FIG. 8 ends.

FIG. 12 shows a screen displayed at the displaying section 25.

It is displayed that an educational material judged as defective occurred, by referring the FAQ of the student.

Then, the defective educational-material unit number and the accumulated defect point are displayed. Further, as a detail of the defect point, the defect point for each keyword is displayed.

At the administrator side of the education center 2, in accordance with the display, the displayed educational-material unit is studied and the content of the educational-material unit is reviewed with reference to the defect point for each keyword. If necessary, the educational-material unit is revised.

The process of FIG. 8 is performed every time that the answer is transmitted to the student in the steps S11 to S13, similar to the process of FIG. 7. Namely, a defectiveness of an educational-material unit is judged for each time that an answer is transmitted. Accordingly, the defectiveness for the educational-material unit is reviewed in real time, and a prompt review of the educational-material unit becomes possible.

According to the present invention, a method for automatically detecting defective part in the educational-material and for indicating the defective part, in the education system using a network, can be obtained.

Also, according to the present invention, an apparatus for implementing the above-mentioned method for indicating the defective part can be obtained.

What is claimed is:

1. A method for indicating a defective part in an educational material in a system for providing an educational service using a network, wherein said system comprises, a receiving step for receiving a question from a student's terminal, a updating step for updating a defect point of a corresponding portion of an education material, in a defective information storing means which stores the defect points correlation with the portions of the educational materials, based on the question received in said receiving step, a judging step for judging whether said defect point has reached a predetermined threshold value by the update in said updating step, and a transmitting step for transmitting said portion of the educational material to a terminal of a system manager, based on the result of the judgement in said judging step.

2. A method for indicating a defective part in an educational material according to claim 1, wherein said updating step updates a defectiveness point of a corresponding portion of an education material, in a defective information storing means which stores the defect points correlated with the portions of the educational materials, based on the question received in said receiving step, with reference to a weight storing means which stores a weight assigned to a keyword appearing in each portion of the educational material.

3. A method for indicating a defective part in an educational material according to claim 2, wherein a weight is set for a new keyword, a supplemental keyword and a reference keyword, in this order, from the largest weight, in said weight storing means.

4. A program product for indicating a defective part in an educational material, wherein it operates steps, using a computer, comprising:

a receiving step for receiving a question from a student's terminal, a updating step for updating a defect point of a corresponding portion of an education material, in a defective information storing means which stores the defect points correlated with the portions of the educational materials, based on the question received in said receiving step, a judging step for judging whether said defect point has reached a predetermined threshold value by the update in said updating step, and a transmitting step for transmitting said portion of the educational material to a terminal of a system manager, based on the result of the judgement in said judging step.

5. A computer-readable recording medium which records therein a program for indicating a defective part in an educational material, by which a computer operates steps comprising:

a receiving step for receiving a question from a student's terminal, a updating step for updating a defect point of a corresponding portion of an education material, in a defective information storing means which stores the defect points correlated with the portions of the educational materials, based on the question received in said receiving step, a judging step for judging whether said defect point reaches a predetermined threshold value by the update in said updating step, and a transmitting step for transmitting said portion of the educational material to a terminal of a system manager, based on the result of the judgement in said judging step.

6. An apparatus for notifying a defective part in an educational material comprising:

a receiving means for receiving a question from a student's terminal, a updating means for updating a defect point of a corresponding portion of an education material, in a defective information storing means which stores the defect points correlated with the portions of the educational materials, based on the question received in said receiving means, a judging means for judging whether said defect point reaches a predetermined threshold value by the update in said updating means, and a transmitting means for transmitting said portion of the educational material to a terminal of a system manager, based on the result of the judgement in said judging means.

* * * * *